(12) United States Patent
Lin

(10) Patent No.: US 6,411,871 B1
(45) Date of Patent: Jun. 25, 2002

(54) AUTONOMOUS NAVIGATION, GUIDANCE AND CONTROL USING LDRI

(75) Inventor: Ching-Fang Lin, Simi Valley, CA (US)

(73) Assignee: American GNC Corporation, Simi Valley, CA (US)

( * ) Notice: Subject to any disclaimer, the term of this patent is extended or adjusted under 35 U.S.C. 154(b) by 0 days.

(21) Appl. No.: 09/924,226

(22) Filed: Aug. 6, 2001

Related U.S. Application Data

(60) Provisional application No. 60/223,549, filed on Aug. 5, 2000.

(51) Int. Cl.$^7$ ................................................ G01C 3/00
(52) U.S. Cl. ........................................ 701/27; 701/28
(58) Field of Search ......................... 701/27, 28, 4, 701/13; 356/5.01, 5.04

(56) References Cited

U.S. PATENT DOCUMENTS

| | | | | |
|---|---|---|---|---|
| 5,675,489 A | * | 10/1997 | Pomerleau | 701/27 |
| 5,684,697 A | * | 11/1997 | Mullen | 701/27 |
| 5,953,110 A | * | 9/1999 | Lin | 356/5.01 |
| 6,057,909 A | * | 5/2000 | Yahau et al. | 356/5.04 |
| 6,275,773 B1 | * | 8/2001 | Lemelson et al. | 701/27 |

* cited by examiner

Primary Examiner—Richard M. Camby
(74) Attorney, Agent, or Firm—Raymond Y. Chan; David and Raymond Patent Group

(57) ABSTRACT

An autonomous navigation, guidance, and control process for docking and formation flying by utilizing the laser dynamic range imager (LDRI) and key technologies, including fuzzy logic based guidance and control, optical flow calculation (including cross-correlation, phase-correlation, and image differential), software design and implementation, and verification methods. The autonomous navigation, guidance, and control process includes the steps of providing an expected reference position relative to a target; generating a carrier position and attitude relative to said target by a Range and Intensity Images Provider; producing a relative position and attitude error; and producing control commands from said relative position and attitude error for relative motion dynamics.

15 Claims, 13 Drawing Sheets

| Δe\e | L | M | S | R | S | M | L |
|------|---|---|---|---|---|---|---|
| L | L | L | L | L | M | S | R |
| L | L | L | L | M | S | R | S |
| M | L | L | L | M | S | R | S | M |
| S | L | L | M | S | R | S | M |
| R | L | M | S | R | S | M | L |
| S | M | S | R | S | M | L | L |
| M | S | R | S | M | L | L | L |
| L | R | S | M | L | L | L | L |

FIG. 6

| Individual Number | Individuals | | |
|---|---|---|---|
| | String | x | f(x) |
| 1 | '001100' | 12 | 118 |
| 2 | '001000' | 8 | 68 |
| . | . | . | . |
| N | '000010' | 2 | 8 |

FIG. 7

```
function [new_gen,selected] = reproduc(old_gen, fitness)

norm_fit = fitness/sum(fitness);
selected = rand(size(fitness));
sum_fit = 0;
for i=1:length(fitness),
    sum_fit = sum_fit + norm_fit(i);
    index = find(selected<sum_fit);
    selected(index) = i*ones(size(index));
end
new_gen = old_gen(selected,:);

% end reproduc
```

FIG. 9

```
function [new_gen,sites] = xover(old_gen, Pc)

lchrom = size(old_gen,2);
sites = ceil(rand(size(old_gen,1)/2,1)*(lchrom-1));
sites = sites.*(rand(size(sites))<Pc);
for i = 1:length(sites);
    new_gen([2*i-1 2*i],:) = [old_gen([2*i-1 2*i],1:sites(i)) ...
                             old_gen([2*i 2*i-1],sites(i)+1:lchrom)];
end % end xover
```

FIG. 10

```
function [new_gen,mutated] = mutate(old_gen,Pm)

mutated = find(rand(size(old_gen))<Pm);
new_gen = old_gen;
new_gen(mutated) = 1-old_gen(mutated);

% end mutate
```

FIG. 11

```
function [gen,lchrom,coarse,nround] = encode(x,vlb,vub,bits)

lchrom = sum(bits);
coarse = (vub-vlb)./((2.^bits)-1);
[x_row,x_col] = size(x);

gen = [];
if ~isempty(x),
    temp = (x-ones(x_row,1)*vlb)./ ...
           (ones(x_row,1)*coarse);
    b10 = round(temp);
    nround = find(b10-temp>1e-4);
    gen = b10to2(b10,bits);
end % end encode
```

FIG. 12

```
function [x,coarse] = decode(gen,vlb,vub,bits)

bit_count = 0;
two_pow = 2.^(0:max(bits));
for i=1:length(bits),
    pow_mat((1:bits(i))+bit_count,i) = two_pow(bits(i):-1:1);
    bit_count = bit_count + bits(i);
end gen_row = size(gen,1);
coarse = (vub-vlb)./((2.^bits)-1);
inc = ones(gen_row,1)*coarse;
x = ones(gen_row,1)*vlb + (gen*pow_mat).*inc;

% end decode
```

FIG. 13

AUTONOMOUS NAVIGATION, GUIDANCE AND CONTROL USING LDRI

Cross Reference of Related Application

This is a regular application of a provisional application having an application Ser. No. 60/223,549 and a filing date Aug. 05, 2000.

FIELD OF THE PRESENT INVENTION

The present invention relates to autonomous navigation, guidance and control utilizing the laser dynamic range imager (LDRI), and more particularly to an LDRI based high precision tracking, guidance and control system, which includes key technologies, including fuzzy logic based guidance and control, optical flow calculation (including cross-correlation, phase-correlation, and image differential), software design and implementation, and verification methods. The present invention is made with Government support under Contract NAS3-00088 awarded by the National Aeronautics and Space Administration (NASA). The Government has certain rights in this invention.

BACKGROUND OF THE PRESENT INVENTION

One application of LDRI-based autonomous navigation, guidance and control is the highly accurate automated docking. Current docking technologies, although very precise, are still not completely reliable. Current technologies include: Video Guidance Sensors, and Space Vision Systems, which provide automated docking software to the Space Program, but they are limited by the use of unique targets which are highly dependent on illumination and orientation. This guidance software requires two cameras to provide a 3-dimensional time history of the relative motion of the Docking Module and the Shuttle.

The autonomous navigation, guidance and control system consists of a motion control loop and an attitude control loop. The motion controller performs the trajectory control, i.e., the relative position tuning between the vehicles, according to the guidance law and the trajectory error. A robust Kalman filter is used to estimate the state variables, as required for relative attitude calculation.

An LDRI (laser dynamic range imager) tracker is implemented to provide the accurate position of special pattern points, which are used to determine the relative attitude, It also tracks the selected pattern of points on the vehicle without loss of the point tracking in the LDRI image pattern. The LDRI technology is a known art as suggested in the following references:

1) Lin, C.F., Modern navigation, guidance, and control processing. Englewood Cliffs, N.J., Prentice-Hall, 1990.

2) Lin, C.F., Advanced control system design. Englewood Cliffs, N.J., Prentice-Hall, 1993.

3) Huntsberger, T. L. and S. N. Jayaramamurthy, Determination of the optic flow field using the spatiotemporal deformation of region properties, Pattern Recognition Letters, 6 (1987), pp. 169–177

4) Huntsberger, T. L. and S. N. Jayaramamurthy, Determination of the optic flow field in the presence of occlusion, Pattern Recognition Letters, 8 (1987), pp. 325–333

5) George Studor, "Laser Dynamic Range Imager Space Shuttle Flight Demonstration," NASA JSC, Houston, Tex. 77058, Structural Mechanics Report (1998)

6) Sharon S. Welch, "Effects of Window Size and Shape on Accuracy of Subpixel Centroid Estimation of Target Images," NASA Langley Research Center, Hampton VA, NASA technical Paper 3331 (1993).

7) William K. Pratt, "Digital Image Processing," $2^{nd}$ Edition, A. Willey-Intersience Publication, John Willey & Sons, Inc., 651–659 (1991)

8) Muguira, M. R., J. T. Sackos, and B. D. Bradley, Scannerless Range Imager with Square Wave, Sandia National Laboratories, Albuquerque, NM 87185-0859, Proceedings SPIE Symposium in Applied Laser Radar Technology II, vol. 2472, pp. 107–113, 1995.

9) Wolf, P. R., Elements of Photogrammetry, McGraw-Hill, New York, $2^{nd}$ Ed., 1983.

10) Pappa, R. S., M. G. Gilbert, and S. S. Welch, Simulation of the Photogrammetric Appendage Structural Dynamics Experiment, Proceedings of the $14^{th}$ IMAC, Dearbon, Mich., pp.873–879, 1996.

11) Schmitt, R. L., R. J. Williams, and J. D. Matthews, High frequency scannerless imaging laser radar for industrial inspection and measurement applications, Sandia Report, SAND96-2739 UC-906, 1996.

12) Pecina, J. N., M. Snyder, C. Sapp, K. Crosby, V. Elliott, P. Saganti, G. Byrne, and M. Gaunce, Dynamic of the Solar Array Motion: An Image Analysis Approach, Proceedings of the 1998 SEM Spring Conference on Experimental and Applied Mechanics, Houston, Tex., June 1–3, 1998.

13) George James III, David Zimmerman, Mike Grygier, George Studor, Jose N. Pecina, and Robert Nellums, Development of Non-Contact Sensors and Data Analysis Tools for ISS Structural Dynamics, AIAA 1999 Annual technical Symposium: Developing Space Operations, Technology, & Utilization, Houston, Tex., May 27–31, 1999.

14) Tian, Q. and M. M. Huhns, Algorithms for Subpixel Registration, Computer Graphics and Image Processing, vol. 35, pp.220–233, 1986.

15) Russ, J. C., The Image Processing Handbook, CRC Press, 1992

16) Overington, I. And P. Greenway, Practical first-difference edge detection with subpixel accuracy, Image and Vision Computing, vol. 5(3), pp. 217–224, 1987

17) Garcia, P., J. Anthes, J. T. Pierce, and et al. Characterization of a scannerless LADAR system, Proceedings of SPIE in Applied Laser Radar Technology, vol. 1936, pp. 23–30, 1993

18) Vassar, R. H. and R. B. Sherwood, Formationkeeping for a pair of satellites in a circular orbit, Journal of Guidance, Control, and Dynamics, Vol.8(2), 1985, pp. 235–242

19) Seifert, H. S. (ed), Space Technology, John Wiley & Sons, New Yew, 1959, pp. 26.28–26.32

20) Clohessey, W. H. and R. S. Wiltshire, Terminal guidance system for satellite rendezvous, Journal of the Aerospace Sciences, vol.27(9), 1960, pp.653–658,674

21) Kapila, V., A. G. Sparks, J. M. Buffington, and Q. Yan, Spacecraft formation flying: dynamics and control, Proceedings of the 1999 American Control Conference, San Diego, Calif., June 1999, pp. 4137–4141

22) Xing, G. Q., S. A. Parvez, and D. Folta, Implementation of autonomous GPS guidance and control for the spacecraft formation flying, Proceedings of the 1999 American Control Conference, San Diego, Calif., June 1999, pp. 4163–4167

23) Beard, R. W. and F. Y. Hadaegh, Finite thrust control for satellite formation flying with state constraints, Proceedings of the 1999 American Control Conference, San Diego, Calif., June 1999, pp. 4383–4387

24) Lawton, J., R. W. Beard, and F. Y. Hadaegh, An adaptive control approach to satellite formation flying with relative distance constraints, Proceedings of the 1999 American Control Conference, San Diego, Calif., Jun. 1999, pp. 1545–1549

25) Guinn, J. R., Precise relative motions of formation flying space vehicles, Proc. of the 1998 AIAA Guidance, Navigation, and Control conference, AIAA-98-4187, pp. 34–39

26) Manikonda, V., P. O. Arambel, M. Gopinathan, R. K. Mehra, and F. Y. Hadaegh, A model predictive control-based approach for spacecraft formation-keeping and attitude control, Proceedings of the 1999 American Control Conference, San Diego, Calif., June 1999, pp.4258–4262

27) Goldberg, D. E., Genetic Algorithm in Search, Optimization, and Machine Learning, Addison Wesley Publishing Company, 1989

28) KrishnaKumar, K., Genetic algorithms: an introduction and an overview of their capabilities, Proc. of 1992 AIAA Guidance, Navigation, and Control Conference, pp. 728–738

29) Press, W. H., S. A.Taukolsky, W. T. Vettering, and B. P. Flannery, Numerical Recipes in C - The Art of Scientific Computing, Cambridge University Press, $2^{nd}$ Edition, 1992

During the approaching process, the accuracy of the relative position and attitude plays a key role that determines the docking success. At this stage, the LDRI tracker is used to obtain the accurate relative position and attitude. The docking activation distance is determined by the LDRI tracker and its sensitivity.

SUMMARY OF THE PRESENT INVENTION

It is an objective of the present invention to provide a method for autonomous navigation, guidance, and control for docking.

It is another objective of the present invention to provide a method for autonomous navigation, guidance, and control for formation flying.

It is a further objective of the present invention to provide a method for autonomous navigation, guidance, and control for docking by using a Laser Dynamic Range Imager (LDRI).

It is a further objective of the present invention to provide a method for autonomous navigation, guidance, and control for formation flying by using a Laser Dynamic Range Imager (LDRI).

BRIEF DESCRIPTION OF THE DRAWINGS

FIG. 6 is a table sheet showing a standard fuzzy logic control rules.

FIG. 7 is a graphical illustration showing a typical string population structure for the genetic algorithm.

FIG. 9 is a graphical illustration showing the selection procedure for the genetic algorithm.

FIG. 10 is a graphical illustration showing the crossover procedure for the genetic algorithm.

FIG. 11 is a graphical illustration showing the mutation procedure for the genetic algorithm.

FIG. 12 is a graphical illustration showing the encoding procedure for the genetic algorithm.

FIG. 13 is a graphical illustration showing the decoding procedure for the genetic algorithm.

DETAILED DESCRIPTION OF THE PRESENT EMBODIMENT

The Laser Dynamic Range Imager (LDRI) developed by Sandia National Laboratories takes care of the illumination problem by using a continuous wave (CW) laser radar to illuminate the scene. The Laser Dynamic Range Imager also eliminates the necessity of using multiple cameras. Each pixel becomes a sensor, since the range is obtained from the phase shift between the incident and reflected laser beams coming from that pixel.

The LDRI generates intensity and range images from that the object motion information can be derived. Generally, an LDRI based range method is based on static LDRI image processing. The assumption is feasible due to the very low docking velocity (about 1 cm/s for low impact docking). To further improve the accuracy of the LDRI based range method, the motion effects will be taken into account by using optical flow analysis techniques.

Figure 1:
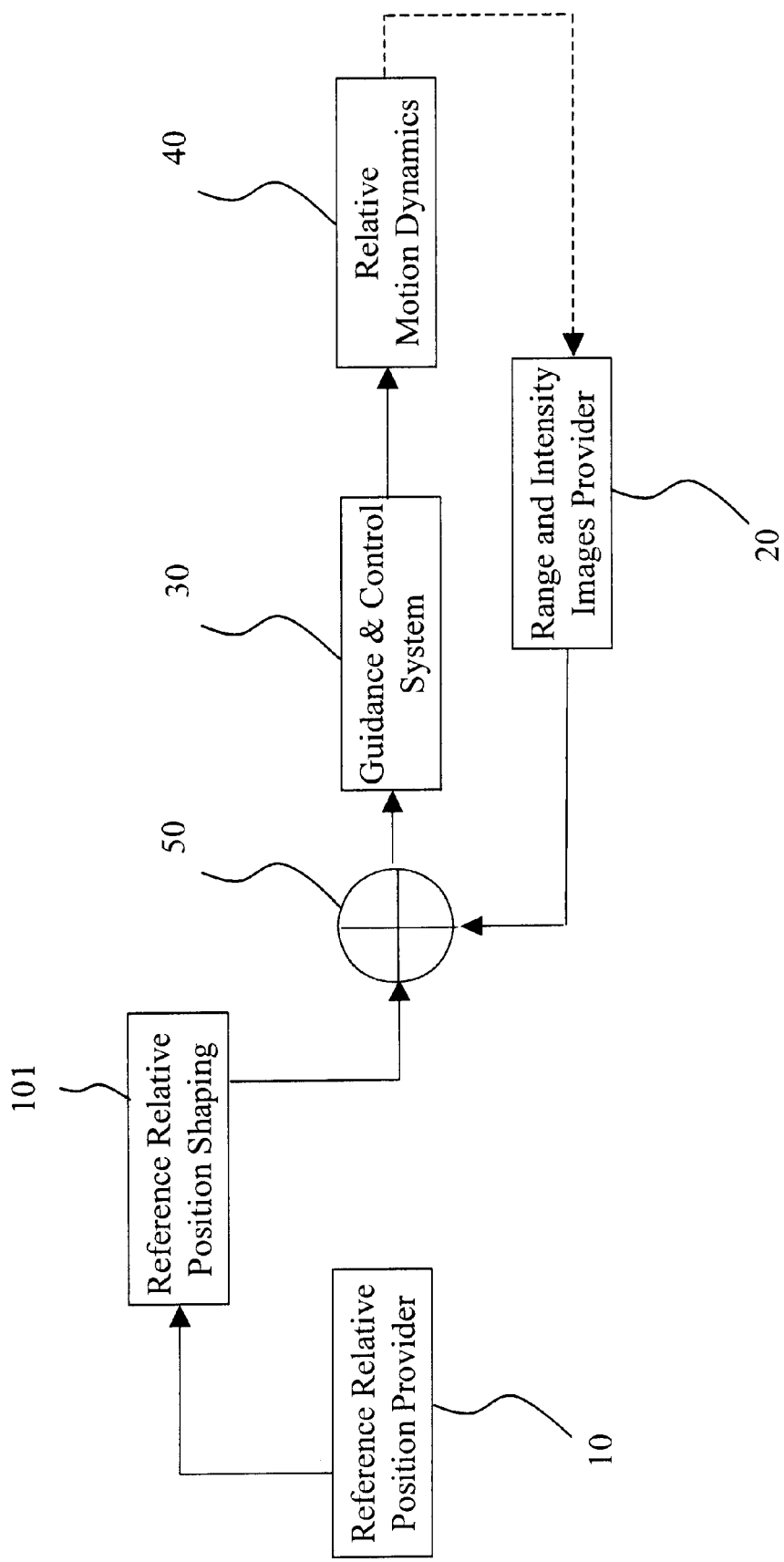
FIG. 1 is a block diagram illustrating the Laser Dynamic Range Imager (LDRI)-based guidance and control loop.

When using LDRI for docking, the reference relative position is set to zero while LDRI coupled with real time image processing software captures the relative motion of object to which the platform is going to dock. To achieve good docking performance, a fuzzy logic based guidance and control system is applied. The system structure of the guidance and control loop is shown in FIG. 1, which describes a formation-keeping case when the reference relative position input has non-zero values. The docking case can also be described as a formation-keeping case with reference relative position along a curve trending to zero, i.e., a desired relative motion trajectory or docking trajectory.

Referring to FIG. 1, the LDRI-based guidance and control system for docking comprises a reference relative position provider 10, a guidance & control system 30, a error calculation module 50, a range and intensity images provider 20, and a relative motion dynamics 40.

A relative position shaping module 101 can be added after the reference position provider 10 and is designed to smooth the reference relative position (or the desired relative position and attitude) transition in order to avoid a sudden input change to the guidance & control system 30. The actual relative position and attitude represented by relative motion dynamics 40 are measured by the range and intensity images provider 20. The range and intensity images provider can be a Laser Dynamic Range Imager (LDRI). The fuzzy logic control technology is employed in the guidance & control system 30 to generate control commands and drive the actuators.

The autonomous navigation, guidance and control process of the present invention comprises the following steps:

Step 1: Provide an expected reference position relative to a target, which can be either a trajectory or a number, by the reference relative position provider 10.

Step 2: Generate a carrier position and attitude relative to the target by the range and intensity images provider 20.

Step 3: Generate a relative position and attitude error by the error calculation module 50, which are output to the guidance & control system 30.

Step 4: Generate control commands by the guidance and control system 30, which are output to the relative motion dynamic 40 in which actuators take the control commands.

Figure 2:
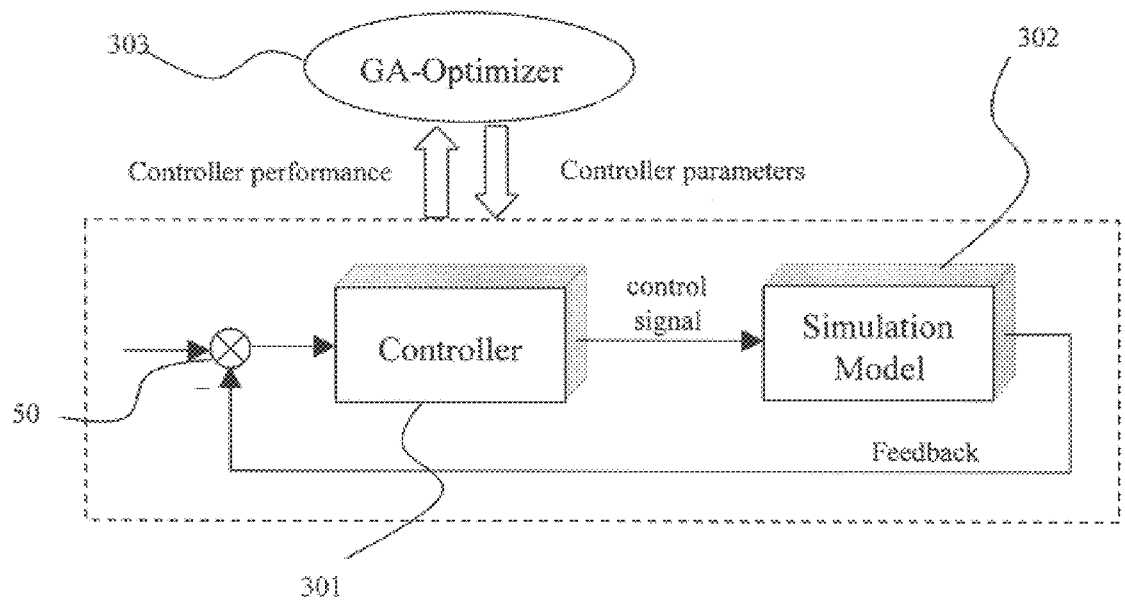
FIG. 2 is a block diagram illustrating the structure of a controller with a Genetic Algorithm (GA)-based optimizer.

FIG. 2 illustrates an offline scheme for controller design and system simulation, where a Genetic Algorithm (GA) is applied to optimize the controller parameters. The guidance and control system 30 comprises at least a control scheme which comprises a controller 301, a simulation model 302 and a GA-optimizer 303. The simulation model 302 simulates the behaviors of the relative motion dynamics 40 and the range and intensity images provider 20. The GA-optimizer 303 searches for optimal parameters for the controller 301.

Figure 3:
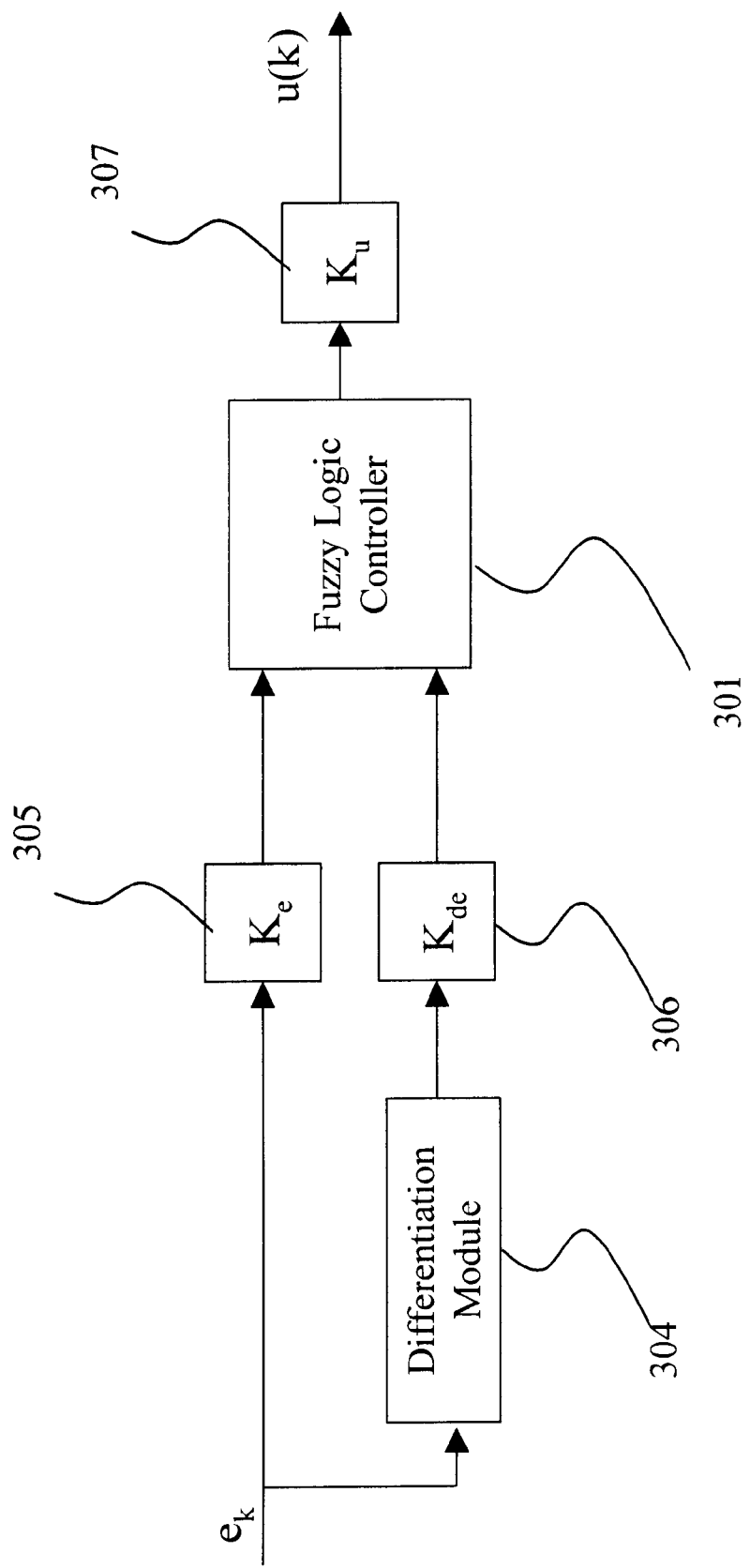
FIG. 3 is a block diagram illustrating the structure of a standard fuzzy logic controller.

In order to simplify the fuzzy logic controller design process, a single and standard fuzzy logic controller (FLC) framework, as shown in FIG. 3, serves as the basis for each of the six required fuzzy logic controllers, three for position control and three for attitude control. The control scheme further comprises a differentiation module 304, a first multiplier 305, a first multiplier 306, and a third multiplier 307. The controller 301 is a fuzzy logic controller.

According to the present invention, the standard FLC frame is preferred to have six control schemes and is adjusted to correspond to each of the six fuzzy logic controllers of the six control schemes by switching amongst six sets of three adjustable scaling parameters ($K_e$, $K_d$, $K_u$).

Referring to FIG. 3, in this standard FLC frame, there are two measurement inputs to the fuzzy logic controller 301, i.e. the error and the error derivative where the error derivative comes from a differentiation operation performed on the error, and one control action output u(k). The scaling parameter, $K_e$, corresponds to the error measurement input, and the scaling parameter, $K_{de}$, corresponds to the error derivative measurement input, while $K_u$ scales the control action output. Generally, a scaling factor is calculated as the ratio of the maximum possible value of the variable to the assumed upper bound of its universe of discourse. The universe of discourse upper bounds for the linguistic variables, error, error derivative, and control output, are four, three, and four, in this standard FLC framework, respectively.

The above step (4) further comprises the steps of:

Step (4.1): performing derivation on the error variables to calculate error derivations by the differentiation module 304; and Step (4.2): collecting the error variables and the error derivatives to generate a control output by the fuzzy logic controller 301.

Figure 4:
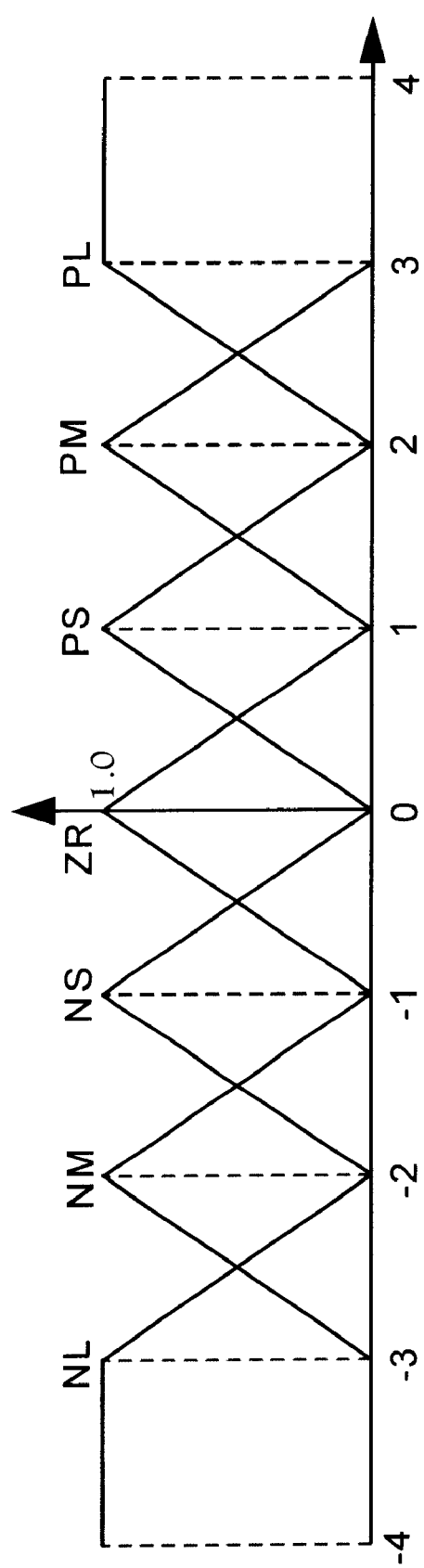
FIG. 4 is a graphical illustration showing the membership functions of the error and the control.
Figure 5:
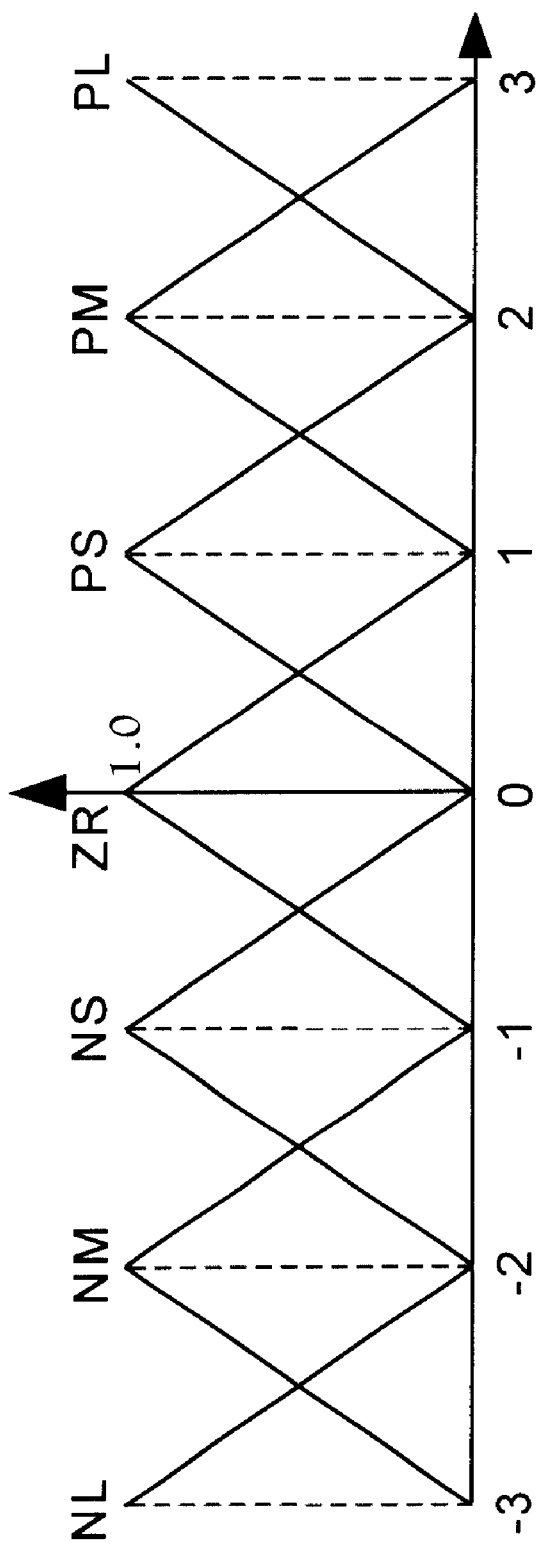
FIG. 5 is a graphical illustration showing the membership function of the error derivative.

Referring to FIG. 4 and FIG. 5, the defined linguistic variable membership functions for the scaled error, scaled error derivative, and scaled control output. The seven fuzzy sets which correspond to the above mentioned membership functions include NL (negative large), NM (negative medium), NS (negative small), ZR (zero), PS (positive small), PM (positive medium), and PL (positive large). The crisp values, e(k) and Δe(k), are scaled to the universe of discourse by suitable scaling factors, $K_e$ and $K_{de}$. Thus, the fuzzified variables are expressed as follows:

$$\overline{e(k)}=F[e(k)/K_e], \quad \overline{\Delta e(k)}=F[\Delta e(k)/K_{de}]$$

where, F represents a fuzzification procedure, which calculates the degree of membership in each of the specific fuzzy sets (NL, NM, NS, ZR, PS, PM and PL). Fuzzy inference employs the max-min composition algorithm to calculate control output fuzzy set membership function values from all possible rules generated by the input linguistic variables, i.e.

$$\mu_j = \max_{k=1}^{m} \{\min[\mu_{VE_k}(\overline{e(k)}), \mu_{VD_k}(\overline{\Delta e(k)})]\}$$

The fuzzy inference process employs 49 rules. These rules are shown in FIG. 6.

During the defuzzification process, the control output value is computed according to the center of gravity method:

$$u = G_u \frac{\sum_{j=1}^{2h-1}(j-h)\mu_j}{\sum_{j=1}^{2h-1}\mu_j}$$

where, [−h, h] represents the universe of discourse for the control input, u.

Each fuzzy logic controller requires only three tuned scaling factors to provide satisfactory system performance.

As described before, the designed fuzzy logic controller is a parameterized controller. For a controller designer, what is necessary to do is to determine just how to find the optimal controller parameters, which satisfy the given constraining conditions and required performance levels. Such parameterized controllers can only work once their parameters have been set to satisfy the required control performance. A fuzzy logic controller can be adapted by adjusting its rules, membership functions, and/or input-output gains (i.e. scaling factors) based on observed performance. Usually, the controller parameters are tuned manually, which is a difficult and troublesome process.

Recently, many techniques for adapting fuzzy logic controllers have been proposed, including several based on classical techniques, neural networks, and genetic algorithms. However, traditional optimization methods, such as gradient-based, hill-climbing search methods, cannot deal with the complexity of multi-parameter search spaces. A genetic algorithm (GA) optimization method, which utilizes natural evolution strategies, offers a promising technology that supports parameter optimization of parameterized controllers. It can effectively reduce the design cycle time to obtain optimal controller parameters.

In this optimization approach, there are three genetic operators used, selection, simple crossover, and mutation. The optimal controller parameters ($K_e$, $K_{de}$, and $K_u$) under different constraint conditions and different index functions are obtained with the largest fitness values, i.e. the smallest index function values. FIG. 2 shows the structure of a controller with a GA-based optimizer.

In the real world, the process of natural selection controls evolution. Organisms most suited for their environment tend to live long enough to reproduce, whereas less-suited organisms often die before producing fewer and/or weaker young. In artificial-life simulations and in the applications of genetic algorithms, we can study the process of evolution by creating an artificial world, populating it with pseudo-organisms and giving those organisms a goal to achieve. Using genetic algorithms, we can then employ a very crude form of evolution to teach the organisms to achieve the stated goal. If the goal, given to these organisms, is the formulation of a problem we confront in our own world, we can, by observing the behavior and characteristics of the successful organisms, discover solutions to our own problem.

Generally, a genetic algorithm includes three operators, i.e. reproduction, crossover and mutation, which are applied to these pseudo-organisms so that those organisms can pass beneficial and survival-enhancing traits to new generations. As we know, in the real world, an organism's characteristics are encoded in its DNA, whereas genetic algorithms store the characteristics of artificial organisms in an electronic genotype, which mimics the DNA of natural life. This electronic genotype is nothing more than a long string of bits (a bit is the small piece of data that a computer can process). It can only be one of two values: 0 or 1.

Here, a genetic algorithm implementation is developed and applied to optimal parameters for a series of given cost functions. This GA optimizer implementation will be further extended to solve the optimal parameters of a fuzzy logic controller.

The GA is a probabilistic algorithm which maintains a population of individuals, $P(t)=x_1(t), \ldots, x_n(t)$ for each iteration t. Each individual represents a potential solution to the problem at hand, and is implemented as some (possible complex) data structure. Each solution $x_i(t)$ is evaluated to give some measure of its fitness. Then a new population (iteration t+1) is formed by selecting the more fit individuals (select step). Some members of the new population undergo transformation (recombine step) by means of "genetic" operators to form new solutions, or a new generation. Generally, most genetic algorithms process populations of strings. Referring to FIG. 7, the primary data structure, for a genetic algorithm is a string population. There are many ways to implement populations P(t). Here, a population is constructed as an array of individuals where each individual contains the phenotype (the decoded parameter or parameters), the genotype (the artificial chromosome or bit string), and the fitness (cost function) value along with other auxiliary information.

Figure 8:
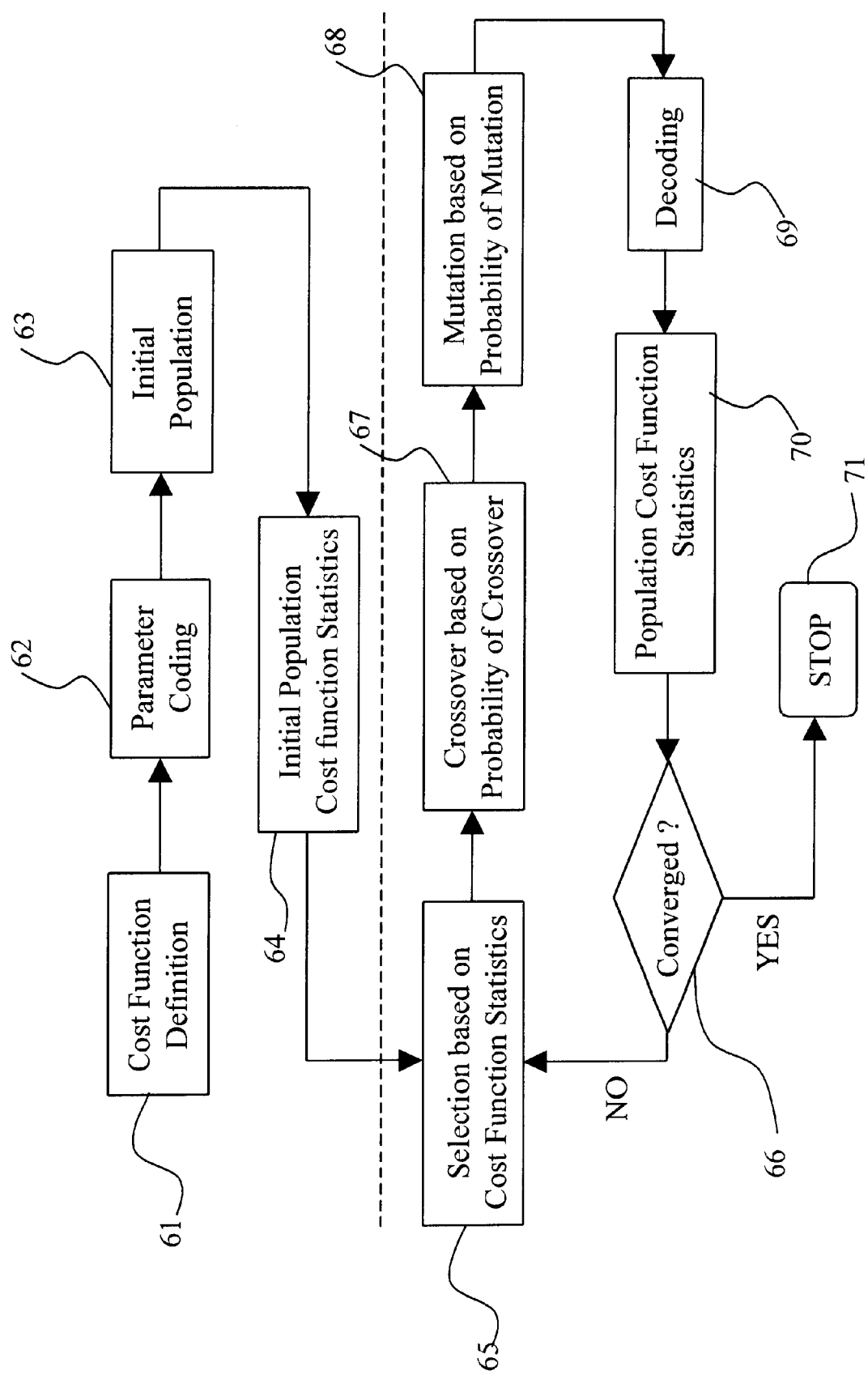
FIG. 8 is a block diagram illustrating the flow chart of the genetic algorithm.

From the above discussion, a general algorithm software implementation flow chart is given in FIG. 8, which comprises a cost function module 61, a parameter coding module 62, a initial population module 63, an initial population cost function statistics 64, a selection based on cost function statistics 65, a crossover based on probability of crossover 67, a mutation based on probability of mutation 68, a decoding 69, a population cost function statistics 70, and a convergence determination module 66. Referring to FIG. 8, the genetic algorithm implementation comprises the following steps:

(1). Cost function definition: defining a cost function;

(2). Parameter Coding: converting the actual parameters into a string (or individual), which is convenient for GA processing;

(3). Initial population: generating an initial population in the parameter space randomly;

(4). Initial population cost function statistics: calculating the fitness of the initial population;

(5). Selection: pairs of individuals for breeding are chosen on a probabilistic basis, wherein fittest individuals are selected as a new generation according to the fitness value of each individual of the population;

(6). Crossover: dividing each parent's binary coding (a string) into two and segments from each parent, which are then combined to give an offspring which has inherited part of its coding from each parent;

(7). Mutation: inverting bits in coding of the offspring with probability of perhaps one in a thousand;

(8). Decoding: converting the population in a binary string form into the actual parameter values; and (9). Population cost function statistics: calculating a fitness value, which is based on a suitable performance criterion, for each of the fittest individuals within the population.

Referring to FIG. 9, for a specified problem, different cost functions (fitness) will be determined to evaluate the population. In many problems, the objective is more naturally stated as the minimization of some cost function J(x) rather than the maximization of some utility or profit function u(x). Even if the problem is naturally stated in a maximization form, this does not guarantee that the utility function will be nonnegative for all x as we require in the fitness function. Therefore, it is necessary to change the cost function into a fitness function. The duality of cost minimization and profit maximization is well known. In normal research work, the simple way to transform a minimization problem to a maximization problem is to multiply the cost function by a minus one. However, in genetic algorithm work, this operation is insufficient because the measure thus obtained is not guaranteed to be nonnegative in all instances. So with GAs the following cost-to-fitness transformation is commonly used $$f(x) = \begin{cases} C_{\max} - J(x) & J(x) < C_{\max} \\ 0 & \text{otherwise} \end{cases}$$

There are a variety of ways to choose the coefficient $C_{max}$. $C_{max}$ may be taken as an input coefficient. For a control problem, the performance measures (cost function J(x)) usually are (1). Average least squares error for all members of the population;

(2). Least squares error for the fittest member of the population;

(3). Normalized variance of each of the physical parameters across the whole population.

All of these performance indicators can be used to decide when the optimization should be terminated.

Selection is the process of choosing two parents from a population for crossing. The reasons for selecting only two parents, and not more, are quite arbitrary. Determining which individuals should interchange their genetic information has great bearing on the rate of convergence specifically and the success of the search in general. It is useful at this point to reflect upon the meaning of the genetic code carried in the chromosomes. Each gene represents a scalar value. The chromosome represents a point in the solution space. The high bits of each gene will position the point coarsely in space, while the lower order bits will have more of a fine tuning effect.

Roulette selection is one of the traditional GA selection techniques, and the version shown here is adapted from Goldberg. The principle of roulette selection is a linear search through a roulette wheel with the slots in the wheel weighted in proportion to the individual's fitness value. A target value is set, which is a random proportion of the sum of the fitness in the population. The population is stepped through until the target value is reached. This is only a moderately strong selection technique, since the fittest individuals are not guaranteed to be selected for, but have a somewhat greater chance. One of the fittest individuals will be the best fittest individual that contributes more to the target value, but if it doesn't exceed it, the next chromosome in line has a chance, and it may be weak. It is essential that the population not be sorted by fitness, since this would dramatically bias the selection.

Another selection is random selection, which randomly selects a parent from the population. In terms of disruption of genetic codes, random selection is a little more disruptive, on average, than roulette selection.

Referring to FIG. 9, the selection operator is implemented by MATLAB. The individuals are selected in proportion to their fitness.

Crossover is essentially the heart of the GA, and exhibits a less marked effect on convergence than selection. Generally, two parents are selected in terms of the given selection technique (as shown in FIG. 10). For each gene in each pair of parents a splice point is selected randomly. The first portion of the parents genes are then exchanged. The children are thus a combination of the parents. This process is repeated for each gene in the parents chromosomes. It is possible for the splice point to be zero, or equal to the number of the bits in the gene, in which case a straight copy is effected.

For the sake of simplicity, the crossover operates at the individual level, i.e. an individual string and is implemented as shown in FIG. 10.

Mutation, which is the process of randomly disturbing genetic information, operates at the bit copy level. When the bits are being copied from the parent to the child, there is a probability that each bit may become mutated. This probability is set by the user, usually to be quite a small value. A coin toss mechanism is employed. If a random number between 0 and 1 is less than the mutation probability, the bit is inverted, so zeros become ones and ones become zeros. This helps lend a bit of diversity to the population by scattering the occasional point. This random scattering just might find a better optimum, or even modify a part of a genetic code that will be beneficial in a latter crossing. On the other hand it might produce a weak individual that will never be selected for crossing.

Random mutation is employed on the population with the mutation probability. Each gene of each individual of the population can mutate independently with the mutation probability. Genes are assumed to possess boolean alleles. The mutation procedure is shown in FIG. 11.

As discussed above, all of the individuals in the population are represented by strings of bits, not the actual parameters of the problem to be solved. A genetic algorithm uses decoded strings to operate, such as selection, crossover and mutation. But the fitness value for each individual is calculated in the actual parameters corresponding to each string. Encoding and decoding procedures are designed to accomplish the transformations from the actual parameters in the given parameter space to a string (binary representation) and from a string to the actual parameters. An encoding procedure performs the binary encoding of a non-binary parameter, as shown in FIG. 12. The decoding procedure restores the actual parameters in the given parameter space corresponding to an individual, as shown in FIG. 13.

Generally, a scaling factor in a fuzzy logic controller is considered as the ratio of the maximum possible value of the variable to the assumed upper bound of its universe of discourse. Three scaling factors ($K_e$, $K_{de}$, and $K_u$) are used to map the error, the error derivative, and the control action for different plants into these standard limits. The scaling parameter, $K_e$, corresponds to the error measurement input, and the scaling parameter, $K_{de}$, corresponds to the error derivative measurement input, while $K_u$ scales the control action output.

The fitness function design is very important to the evaluation of each individual in one generation. In this project, two index functions are designed to evaluate the FLC performance under a specified group of scaling factors, which are as described below $$J_1 = \sum_k e^2(k)$$

$$J_2 = \sum_k |e(k)|$$

A vehicle carrying an LDRI imaging sensor and, in motion, affects the sensed imagery in a definite way dependent on the vehicle's translational velocity, angular velocity and depth distribution of the scene elements with respect to the sensor. It is fundamentally immaterial whether the sensor moves or the scene elements move. What is relevant is the relative motion. This mechanical relative motion results in the movement of the pixels in the sensed scene which can be described by local (per pixel) velocity vectors in the image plane. The collection of all the individual pixel velocity vectors constitutes a velocity field called "optical flow". The fundamental perspective transformation of the imaging process is investigated and the exact optical flow equations are derived leading to the relations to the motion parameter determination.

In order to obtain the object velocities, it is necessary to estimate the image velocity or optical flow. Two techniques can be used for computation of the image velocity or optical flow. They are, namely, feature-based and field-based approaches. Each has advantages and limitations. The feature-based approach follows the motion of some selected scene pixels such as edges, corners, lines, etc. Thus it is efficient in computation. But it suffers from the need to identify objects between successive frames. This is not necessary for the field-based approach, which tracks all the points in the field of view. This can be computationally expensive and subject to higher sensitivity to noise effects. A trade has to be made with respect to performance and complexity.

The above LDRI image optical flow investigation shows that when there is relative motion between a LDRI sensor and a scene the scene pixels encode this motion in direct relation to the motion parameters such as the relative translation and angular velocities. The implication is that image processing can effectively yield navigation information. Even further, with the navigation information known, it is possible to extract a "depth" map of the scene, i.e., one can determine the range corresponding to the various scene pixels.

Although the theoretical underpinnings for extracting navigation information from image data are unassailable, there are certain key considerations that precondition the expected success of such an operation. A key observation is that pixel movement is deduced by the movement of the corresponding image intensity value. And for such movement to manifest itself there is a need for this pixel's intensity to differ from that of its neighbors. Thus, a pixel's motion is revealed in direct proportion to its spatial intensity gradient values. In other words, pixel motion is most apparent where the edges are strongest. To reinforce an appreciation for this statement let the case of a perfectly flat scene across the whole field of view be considered. In this case, whatever the relative motion between the sensor and the scene might be it would be imperceptible to either a viewer or a motion detection algorithm. On the contrary, movement in edges and contrast textured scene becomes immediately apparent.

The fundamental basis for extracting ownship motion and environment information from an image is provided by the fact that image pixel motion is directly linked through the image formation process to ownship and scene motion. A sequence of images supplied by the sensor can thus be processed to obtain pixel velocity (optical flow) measurements. Angular rates of roll, pitch, and yaw can in turn be derived as well as depth-scaled translational velocity information. This is a very useful approach in applying the optical flow to engineering issues. To exploit this potential and advance the idea to a practical level, several optical flow based image processing and tracking approaches are evaluated to apply the LDRI based precision tracking. By using the accompanying range image data, the tracked target's velocity can be determined from the pixel velocity.

Correlation of two- or three-dimensional images allows us to implement the idea of template (pattern) matching in two or more separate views, or in a continuous set of image frames. A template (pattern) is a specially selected sub-image, which has a unique feature different from the other image area to be searched. A target pattern (template) is shifted to every location in the image. The cross-correlation function values measure the degree of similarity of two image patterns. The maximum correlation occurs at the x-y shift values where the two image patterns most similarly match.

The cross-correlation has been used in many fields to locate features within images. For instance, to measure the structure dynamic characteristics of the International Space Station (ISS), to inspect vehicles, and to track the motion of hurricanes in a series of weather satellite images. When the target pattern is a pattern of pixel brightness values from one image in a stereo pair and the searched image is the second image from the pair, the method has been used to perform fusion (locating matching points in the two images) to measure parallax and calculate range.

In real video images, the illuminance (brightness) of the scene varies due to uncertain environmental effects. If the image energy varies with position, pattern matching can fail. For example, the correlation between the pattern and an exactly matching region in the image may be less than that of the pattern and a bright spot. To eliminate the effects, a normalized cross-correlation formula, as expressed below, can be used.

To achieve fast point or pattern tracking by using the cross-correlation technique, usually a smaller target pattern or several target patterns are selected. There are two major problems in searching for the specified target patterns in the whole image region. One is the heavy computation load and the other the possible multiple maximum positions, or the false maximum correlation position. The tracked pattern determination depends on the special mission. The search region is determined by the selected pattern size and the possible maximum velocity of an object, i.e. the possible shift in pixels between two successive frames.

The cross-correlation functions of images A and B are calculated by shifting image B over the search range of $(N_{ax}-N_{bx})$ pixels in the x direction and $(N_{ay}-N_{by})$ pixels in the y direction from its left-top position. $N_{ay}$ and $N_{by}$ represent the width and height of the search region, respectively. $N_{bx}$ and $N_{by}$ represent the width and height of the pattern (feature or template). The shift values $0 \leq i \leq N_{ax}-N_{bx}$ and $0 \leq j \leq N_{ay}-N_{by}$ must be somewhat larger than the distance that the target has moved from image A to image B.

In practice, the target (pattern or feature) is updated from one image frame to another image frame in order to eliminate the effects of rotation and illuminance differences.

According to above discussion, there is a requirement of $N_{bx}N_{by}$ $(N_{ax}-N_{bx}+1)(N_{ay}-N_{by}+1)$ additions and $N_{bx}N_{by}$ $(N_{ax}-N_{bx}+1)(N_{ay}-N_{by}+1)$ multiplications for a search window (region) of size $N_{ax}$ by $N_{ay}$ and a pattern of size $N_{bx}$ by $N_{by}$. The cross correlation is a convolution of the image with the reversed pattern and can be calculated simply in the frequency-domain. When the dimensions of the summation are large, that is, $N_{ax}$ by $N_{ay}$ is much greater than $N_{bx}$ by $N_{by}$, the complexity of the direct spatial computation is approximately $N_{ax}N_{ay}N_{bx}N_{by}$ and the direct method is faster than the frequency method. The direct cross-correlation method becomes a slow and inefficient process compared to the equivalent operation when the pattern window size approaches the search window size with larger dimensions.

Variation in the image energy of the pattern caused by illuminance differences or other uncertain factors can be reduced by high-pass filtering the image before cross-correlation. This filtering can be conveniently added to the frequency domain processing, but selection of the cutoff frequency is problematic—a low cutoff frequency may leave out significant image variations, whereas a high cutoff frequency may remove useful information. A more robust method is phase correlation, which is based on the fact that most of the information about the relative displacements of objects between two frames is included in the phase of their cross-power spectrum. In the phase correlation approach, the Fourier transform function is normalized to unit magnitude prior to computing correlation in the frequency domain by selecting a proper norm. This will remove the dependencies on the image content while leaving dependencies on image shifts. Thus, the correlation is based only on phase information and is insensitive to changes in image intensity.

Usually, when correlation is performed, the wraparound assumption, joining the left and right edges and the top and bottom of the image, is not acceptable. In these cases, the image should be padded by surrounding it with zeroes to bring it to the next larger size for transformation (the next exact power of two, required for Fast Fourier Transform (FFT) calculations). Since the correlation operation also requires that actual magnitude values of the transforms be used, slightly better mathematical precision can be achieved by padding with the average values of the original image intensities rather than with zeroes. It may also be useful to subtract the average intensity value from each pixel, which removes the zeroth (DC) term from the transformation. Since this value is usually the largest in the Fast Fourier Transform (it is at the central pixel), its elimination allows the Fast Fourier Transform data to have more dynamic range.

The basic idea of the differential method is based on the fact that image object motion information is contained in the image intensity variation between two successive frames, i.e. it is possible to relate the difference between two successive frames to the spatial intensity gradient of the first image. The velocity is computed directly from image intensity in terms of its spatiotemporal derivatives.

The differential algorithm is a continuous formula. In an actual scenario, all the images are sampled one frame at a time in a discrete mode with a fixed sampling rate.

What is claimed is:
1. An autonomous navigation, guidance and control process, comprising the steps of
(a) providing an expected reference position relative to a target;
(b) generating a carrier position and attitude relative to said target by a Range and Intensity Images Provider;
(c) producing a relative position and attitude error; and
(d) producing control commands from said relative position and attitude error for relative motion dynamics.

2. An autonomous navigation, guidance and control process, as recited in claim 1, wherein said Range and Intensity Images Provider is a Laser Dynamic Range Imager (LDRI).

3. An autonomous navigation, guidance and control process, as recited in claim 2, wherein said expected reference position relative to said target is a trajectory and is provided by a reference relative position provider.

4. An autonomous navigation, guidance and control process, as recited in claim 2, wherein said expected reference position relative to said target is a number and is provided by a reference relative position provider.

5. An autonomous navigation, guidance and control process, as recited in claim 2, after the step (a), further comprising a step of smoothing said reference position relative to said target.

6. An autonomous navigation, guidance and control process, as recited in claim 3, after the step (a), further comprising a step of smoothing said reference position relative to said target.

7. An autonomous navigation, guidance and control process, as recited in claim 4, after the step (a), further comprising a step of smoothing said reference position relative to said target.

8. An autonomous navigation, guidance and control process, as recited in claim 3, wherein the step (d) further comprises the steps of:

(d.1) performing derivation on error variables to calculate error derivations; and (d.2) collecting said error variables and said error derivatives to generate a control output.

9. An autonomous navigation, guidance and control process, as recited in claim 4, wherein the step (d) further comprises the steps of:

(d.1) performing derivation on error variables to calculate error derivations; and (d.2) collecting said error variables and said error derivatives to generate a control output.

10. An autonomous navigation, guidance and control process, as recited in claim 6, wherein the step (d) further comprises the steps of:

(d.1) performing derivation on error variables to calculate error derivations; and (d.2) collecting said error variables and said error derivatives to generate a control output.

11. An autonomous navigation, guidance and control process, as recited in claim 7, wherein the step (d) further comprises the steps of:

(d.1) performing derivation on error variables to calculate error derivations; and (d.2) collecting said error variables and said error derivatives to generate a control output.

12. An autonomous navigation, guidance and control system, comprising:

a reference relative position provider which provides an expected reference position relative to a target;

a guidance and control system generating control commands;

an error calculation module for deriving a difference between a measured relative position and said reference relative position;

a range and intensity images provider producing range images and intensity images; and a relative motion dynamics which receives said range images and intensity images for performing a control actuation.

13. An autonomous navigation, guidance and control system, as recited in claim 12, further comprising of a relative position shaping module for smoothing said reference relative position.

14. An autonomous navigation, guidance and control system, as recited in claim 12, wherein said range and intensity images provider is a Laser Dynamic Range Imager (LDRI).

15. An autonomous navigation, guidance and control system, as recited in claim 13, wherein said range and intensity images provider is a Laser Dynamic Range Imager (LDRI).

* * * * *

UNITED STATES PATENT AND TRADEMARK OFFICE
CERTIFICATE OF CORRECTION

PATENT NO. : 6,411,871 B1
DATED : June 25, 2002
INVENTOR(S) : Ching-Fang Lin

It is certified that error appears in the above-identified patent and that said Letters Patent is hereby corrected as shown below:

<u>Column 1,</u>
Line 21, after "(NASA)", insert -- and Contract NAS3-01128 awarded by the Jet Propulsion Laboratory, California Institute of Technology --.

Signed and Sealed this

First Day of October, 2002

Attest:

Attesting Officer

JAMES E. ROGAN
*Director of the United States Patent and Trademark Office*